United States Patent [19]
Yamasaki et al.

[11] Patent Number: 5,491,525
[45] Date of Patent: Feb. 13, 1996

[54] ILLUMINATION UNIT FOR LIQUID CRYSTAL PROJECTION DISPLAY APPARATUS AND LIQUID CRYSTAL DISPLAY APPARATUS HAVING IT USED

[75] Inventors: Futoshi Yamasaki, Chigasaki; Yoshio Ariki, Yokohama; Masaharu Deguchi, Shimizu; Takashi Kakuda, Yokohama; Takanori Hisada, Yokohama; Takesuke Maruyama, Yokohama, all of Japan

[73] Assignee: Hitachi, Ltd., Tokyo, Japan

[21] Appl. No.: 154,928

[22] Filed: Nov. 19, 1993

[30] Foreign Application Priority Data

| Nov. 24, 1992 | [JP] | Japan | 4-312529 |
| Feb. 5, 1993 | [JP] | Japan | 5-017755 |
| Aug. 2, 1993 | [JP] | Japan | 5-191224 |

[51] Int. Cl.$^6$ ............... F21V 7/02; G03B 21/28
[52] U.S. Cl. ............... 353/98; 353/37; 359/49; 362/298; 362/346
[58] Field of Search ............... 353/31, 34, 37, 353/98, 99, 102, 38, 122; 362/296, 297, 298, 341, 346, 347; 359/49, 48

[56] References Cited

U.S. PATENT DOCUMENTS

| 1,867,138 | 7/1932 | Christmas | 362/298 |
| 4,422,135 | 12/1983 | McCamy | 362/298 |
| 5,056,912 | 10/1991 | Hamada et al. | 353/38 |
| 5,098,184 | 3/1992 | van den Brandt et al. | 353/38 |
| 5,142,387 | 8/1992 | Shikama et al. | 353/122 |
| 5,192,962 | 3/1993 | Nishida et al. | 353/98 |
| 5,217,299 | 6/1993 | Yoshida et al. | 362/346 |
| 5,295,005 | 3/1994 | Nishida et al. | 359/49 |

FOREIGN PATENT DOCUMENTS

| 58-66909 | 4/1983 | Japan . |
| 60-63273 | 4/1985 | Japan . |
| 61-74076 | 4/1986 | Japan . |
| 61-114376 | 6/1986 | Japan . |
| 61-114375 | 6/1986 | Japan . |
| 61-74075 | 11/1986 | Japan . |
| 1-120192 | 5/1989 | Japan . |
| 3-131835 | 6/1991 | Japan . |
| 4-5643 | 1/1992 | Japan . |
| 4-328538 | 11/1992 | Japan . |
| 5-11343 | 1/1993 | Japan . |

Primary Examiner—William C. Dowling
Attorney, Agent, or Firm—Fay, Sharpe, Beall, Fagan, Minnich & McKee

[57] ABSTRACT

A bulb (4) of lamp (1) has a reflection film (2) or reflection mirror (9) to make light components going outside a reflector (3) direct to the reflector (3) to reflect. If the lamp (1) is a spot light source, a light emission center is positioned at a center of spherical reflection mirror (9). If the lamp (1) is not a spot light source, the reflection mirror (9) is made ellipsoid and at its two focal points, ends of two light emitting electrodes are positioned. Also, the lamp (1) having the reflection mirror (9) is used in the illumination unit for a liquid crystal display apparatus to increase the brightness of the image projected onto the screen (26). Further, the liquid crystal display device (23) has within a liquid crystal display device (23) a microlens array for collecting the incoming light into an area of each picture element electrode (39) to increase the light utilization efficiency of the liquid crystal display device (23).

5 Claims, 13 Drawing Sheets

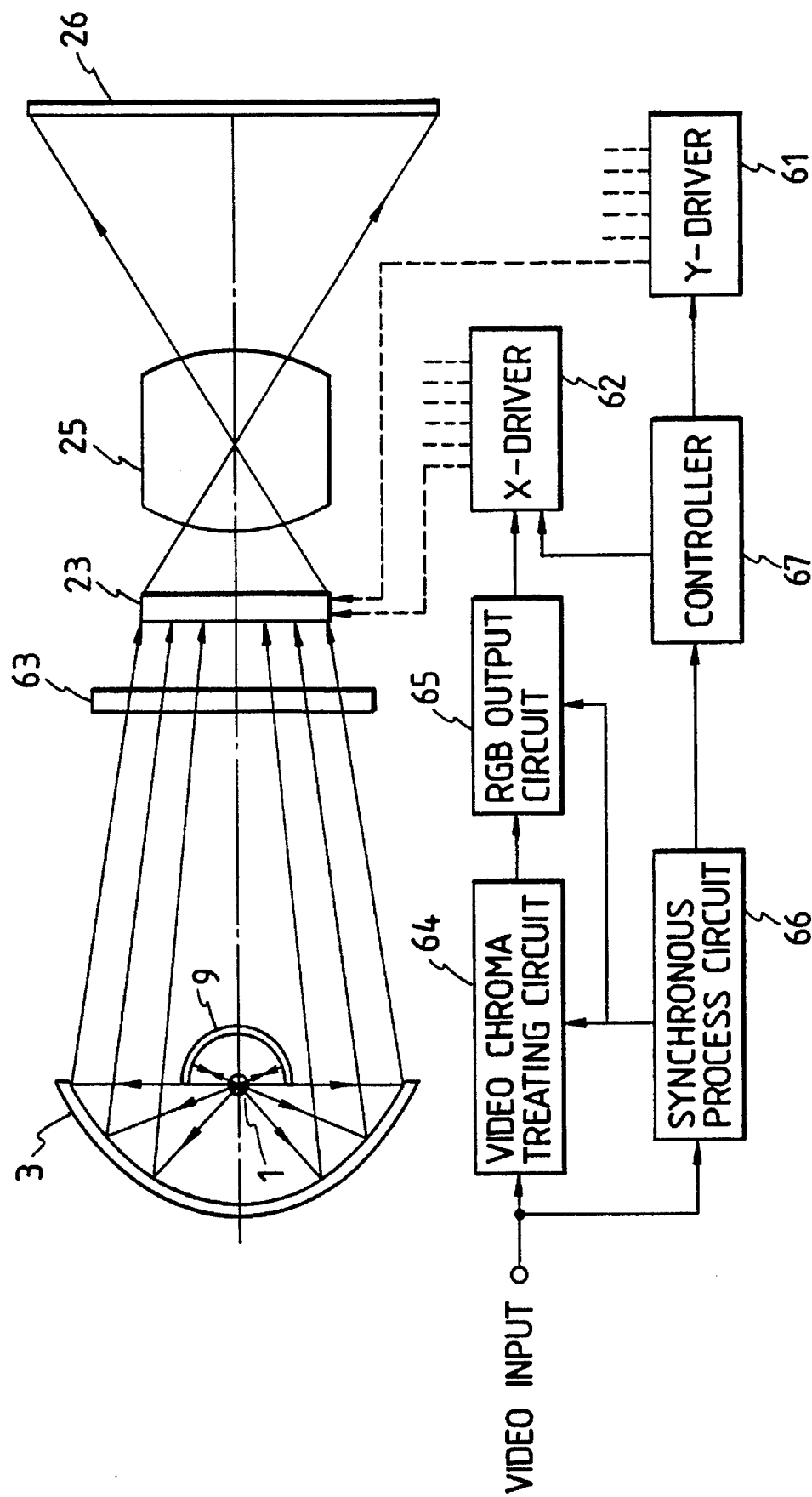

ILLUMINATION UNIT FOR LIQUID CRYSTAL PROJECTION DISPLAY APPARATUS AND LIQUID CRYSTAL DISPLAY APPARATUS HAVING IT USED

BACKGROUND OF THE INVENTION

The present invention relates to an illumination unit for liquid crystal projection display apparatus and a liquid crystal projection display apparatus. More particularly, it concerns a bright illumination unit for liquid crystal projection display apparatus for efficiently collecting a light emitted from the illumination unit to an illumination surface, or a liquid crystal surface (24), without widening, or rather narrowing, an angle for luminous flux, and concerns a liquid crystal projection display apparatus having it used therein.

Prior illumination units for use in a liquid crystal projection display apparatus are described, for example, in the Japanese Patent Laid-Open Nos. 1-120192 and 3-230404. Most of the prior illumination units, as shown in FIG. 7, are formed of a lamp (1) and a reflector (3). In the figure, reference numerals 11 and 12 indicate light components.

There are prior liquid crystal display apparatuses, for example, a direct sight display apparatus that an image is formed on a light valve as a change of optical characteristic with a given video signal, is illuminated by a light source, and is directly viewed; and a projection display apparatus that an image is projected through a projection lens (25) to a screen (26) as an optical image. Many types of light valves having a liquid crystal display device (23) of transillumination type have been proposed for use in such liquid crystal display apparatuses.

Prior illumination units having the liquid crystal display device (23) of transillumination type for use in the liquid crystal projection display apparatus are described, for example, in the Japanese Patent Laid-Open Nos. 64-38725 and 1-182877. In the prior illumination units, the light emitted from a light source is reflected by one reflector (3) to illuminate the liquid crystal display device (23).

Prior illumination units, like the present invention, formed of a plurality of reflectors (3) or a plurality of reflectors (3) and a condenser lens (14) include disclosures in the Japanese Patent Laid-Open Nos. 58-66909, 2-132403, 3-131835, 4-5643, 4-328538, and 5-11343.

However, the usual illumination units for use in the liquid crystal projection display apparatus cannot have a sufficiently high light utilization coefficient since there are light components, such as the light components (11) in FIG. 7, that are not directed toward the reflector (3), but scatter out.

Also, the usual illumination units have a problem that an actual light emitting gap of a metal halide lamp used as a light source in the liquid crystal projection display apparatus is too large to have a high light condensing rate.

In order to compensate such a loss, the reflector (3) has to be made larger. However, the large reflector (3) causes the whole apparatus to be made larger and widens an angle for luminous flux which is an angle of the light coming onto the liquid crystal display device (23), which is an illumination surface. With increase of the angle for luminous flux, the following problems are caused, resulting in difficulty of increasing the brightness of the liquid crystal display apparatus.

First, operation of a microlens array (42) is described below. The liquid crystal display device (23), as shown in FIG. 11, has many picture element electrodes (39) acting as light valves arranged in a matrix fashion. There is a light shutting portion (40) around each of the picture element electrodes (39). The light coming to the light shutting portion (40) cannot be effectively used as being interrupted by it. The term "angular aperture" as used herein denotes a ratio of area of the picture element electrode (39) allowing the light to pass to an area (45) corresponding to one picture element. If the angular aperture is increased, the liquid crystal display apparatus can be made brighter. However, this depends on the liquid crystal display device (23). For this reason, the reflector (3) is made to have the microlenses 42 on the incoming light side of the picture element electrodes (39) in the matrix fashion corresponding to the respective picture element electrodes (39). The microlenses 42 can collect the light to enter the picture element electrodes (39) to increase the effective angular aperture. However, as shown in FIG. 20, when the angle of light irradiated to the microlens increases, the effect of improvement of the effective numerical aperture by the microlens reduces. When the angle increases further, the effective numerical aperture becomes lower than that when no microlens is provided and the brightness of the projected images reduces inversely. The effective angular aperture cannot be increased. This causes the brightness of the projected image to be lowered. This is not desirable. FIG. 20 depicts a graph illustrating the effective angular aperture of the liquid crystal display device (23) by the microlens array (42) to the angle for luminous flux from the light source 1 to the liquid crystal display device (23) in the liquid crystal projection display apparatus having the microlens array (42) used therein. In FIG. 20, letter A denotes the effective angular aperture without microlens array (42), and letter B is the effective angular aperture with the microlens array (42). We can see in FIG. 20 that the effective angular aperture is decreased with the angle for luminous flux. We can also see that the effective angular aperture (%) is decreased at a larger angle for luminous flux as compared with that of no microlens array (42).

Thus, as described above, even if the reflector (3) is made larger to increase the light collection rate, the angle for luminous flux is made larger at the same time. This decreases the effective angular aperture of the microlens array (42). A total light utilization coefficient cannot be increased.

SUMMARY OF THE INVENTION

In view of solving the foregoing problems of the prior arts, it is an object of the present invention to provide a liquid crystal projection display apparatus that can accomplish a higher image by decreasing the light component (11) in FIG. 7 to increase the amount of effective light components (12) without making the reflector (3) larger, or without increasing the collection angle of the light flux to the liquid crystal display device (23) having the microlens array (42).

The present invention can increase the utilization rate of the light going out of the lamp (1) since the reflection film (2) or the reflection mirror (9) provided in the bulb (4) of the lamp (1) can reflect to the reflector (3) even the light components of the lamp (1) which are usually scattered out, thereby being capable of using them.

Also, the present invention can increase the brightness of the image projected onto the screen (26) since the lamp (1) having the reflection film (2) or the reflection mirror (9) is used as the light source for the liquid crystal display apparatus.

Further, the present invention can increase the light utilization efficiency of the liquid crystal display device (23) to further increase the brightness of the image projected onto the screen (26) since the microlens array (42) for converging the incoming light into the area of each of the picture element electrodes (39) is provided in the liquid crystal display device (23) for use in the liquid crystal display apparatus.

BRIEF DESCRIPTION OF THE DRAWINGS

FIG. 16 is a sectional view and a block diagram illustrating a construction of a first embodiment of the present invention for a liquid crystal display apparatus.

DESCRIPTION OF THE PREFERRED EMBODIMENTS

Figure 1:
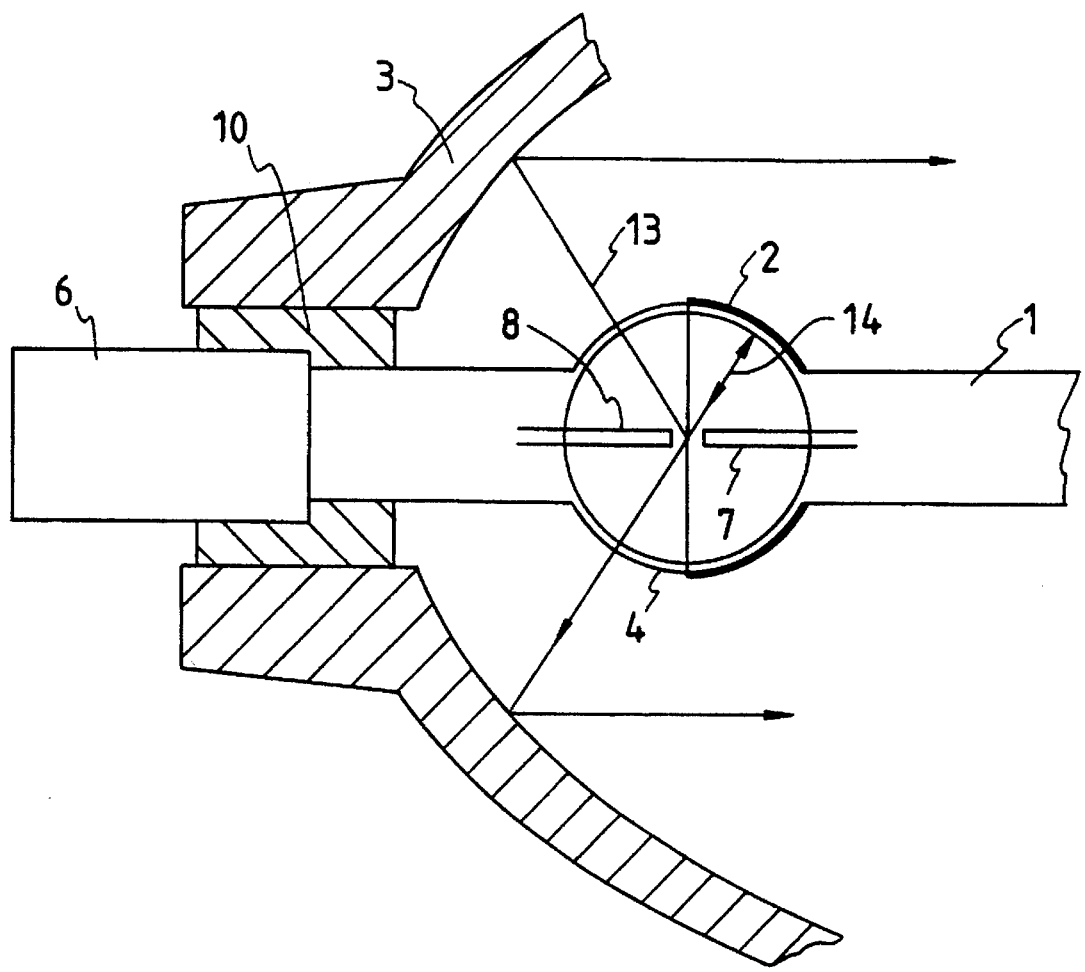
FIG. 1 is a partly sectional view illustrating a construction of an illumination unit of the present invention having a lamp (1) that can be virtually regarded as a spot light source.
Figure 6:
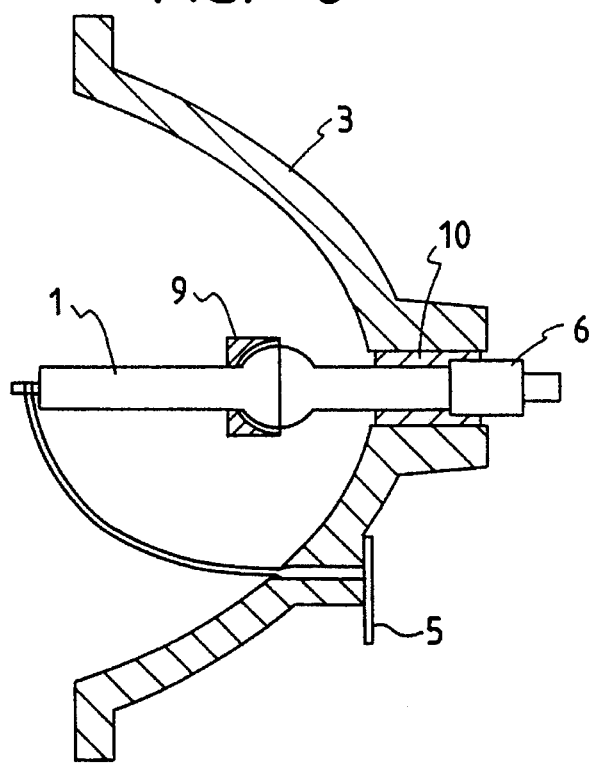

In order to achieve the above-mentioned object, the illumination unit for projection display apparatus of the present invention is made of a reflection film (2) or a reflection mirror (9) provided at a part of a bulb (4) of the lamp (1) for reflecting emitted light components to the reflector (3), the reflection film (2) or the reflection mirror (9) being shaped spherical or ellipsoid as shown in FIG. 1 and FIG. 6 etc.

Also, a center of light emission in the bulb (4) of the lamp (1) is made to coincide with a center of a sphere of the reflection film (2). Or, ends of two light emitting electrodes in the bulb (4) of the lamp (1) are made to coincide with two focal points of the ellipsoid of the reflection film (2), respectively.

Similarly, the illumination unit for liquid crystal projection display apparatus of three-panel type is made of a reflection film (2) or a reflection mirror (9) provided at a part of a bulb (4) of the lamp (1) for reflecting emitted light components to the reflector (3), the reflection film (2) or the reflection mirror (9) being shaped spherical or ellipsoid. The liquid crystal display apparatus is made to separate into three primary colors the light emitted, to illuminate the three respective primary colors onto three liquid crystal display devices (23), and to compose the lights emitted, and use a projection lens (25) for projecting the light to a screen (26).

Further, there is provided a microlens array (42) formed of unit lens sections for collecting into an area of every picture element electrode (39) forming the liquid crystal display device (23) a light coming out of a polarizing plate (41) provided to the light incoming surface in the liquid crystal display device (23).

Still further, the illumination unit for liquid crystal projection display apparatus has a condenser lens (14) for condensing the light emitted from the illumination unit for projection display apparatus before illuminating to the liquid crystal display device (23) or the spectral diffraction means.

Still further, there is provided in an optic axis direction of the light flux, a correction lens (53) approximately at a point where the light flux emitted from the reflector (3) of the illumination unit for projection display apparatus overlaps on the optic axis.

Still further, the illumination unit has the reflector (3) shaped ellipsoid to meet an equation below, thereby capable of accomplishing a higher light collection rate $$(D \times L)/(D+y) < f < (D \times L)/(D-y) \quad \text{(C-1)}$$

where L denotes a distance from a center of the reflector (3) to the illumination surface, f is a second focal length of the reflector (3), D is an aperture of the reflector (3), and y is a diagonal length of the illumination surface.

Otherwise, the illumination unit has the reflector (3) shaped paraboloid to meet an equation C-2 below, thereby capable of accomplishing a higher light collection rate $$(D \times LO)/(D+y) < f_{CL} < (D \times LO)/(D-y) \quad \text{(C-2)}$$

where LO denotes a distance from the condenser lens (14) to illumination surface of the liquid crystal display device (23), and $f_{CL}$ is a focal length of the condenser lens (14).

The reflection film (2) or the reflection mirror (9) provided in the reflection film (2) of the lamp (1) can reflect to the reflector (3) light components which are emitted outward, but will not go to the reflector (3), of the light components emitted by the lamp (1).

As the center of light emission in the bulb (4) of the lamp (1) is made to coincide with the center of the sphere of the reflection film (2), the light components emitted by the lamp (1) can be efficiently reflected to the reflector (3).

As the ends of the two light emitting electrodes in the bulb (4) of the lamp (1) are made to coincide with the two focal points of the ellipsoid of the reflection film (2), respectively, the light components emitted by the lamp (1) can be efficiently reflected to the reflector (3) even when the light emitting gap (51) of the lamp (1) has some dimensions.

The light coming into the liquid crystal display device (23) can be passed by the same rate as the ratio of the aperture area of the picture element electrode to the area of one picture element of the liquid crystal display device. That is, a light pass rate is increased with the angular aperture which is the ratio so that a brighter image can be obtained. However, it is impossible to widen the aperture area of the picture element electrode too much. Instead, there is a method that the microlenses are provided to correspond to the picture elements of the liquid crystal display device to collect the incoming lights to allow them to pass the aperture areas. Note that substantial increase of the angular aperture by the microlenses depends on the light incident angle.

Figure 20:
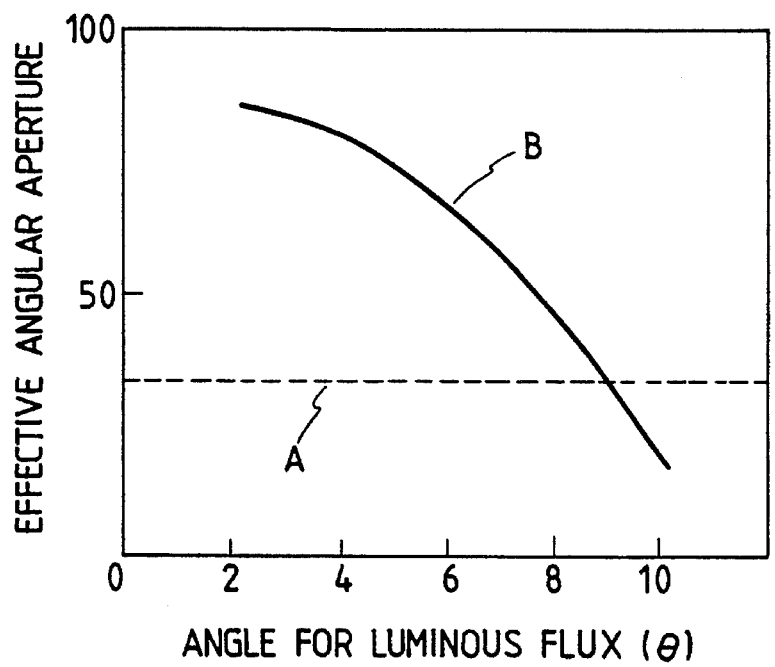
FIG. 20 is a graph illustrating an effective angular aperture by a microlens array of the present invention.

FIG. 20 shows that the substantial increase of the angular aperture by the microlenses depends on the light incident angle. The angular aperture is made narrower with the incident angle. On the contrary, the angular aperture can be made wider with the incident angle made less, thereby capable of accomplishing a brighter image.

Figure 21A:
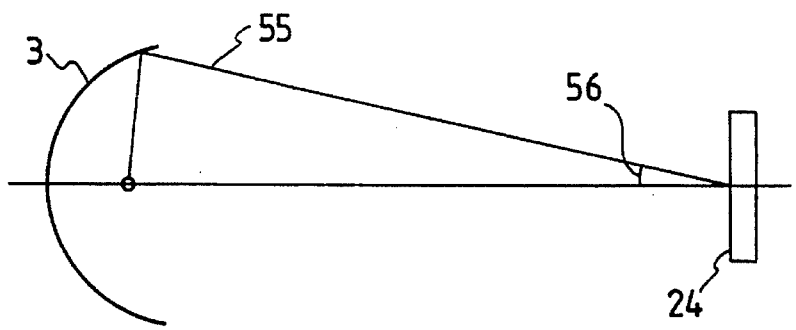
FIGS. 21a and 21b are sketches illustrating manners in which a reflection film of the present invention can make narrower an angle for luminous flux to a liquid crystal surface of a liquid crystal display device.
Figure 21B:
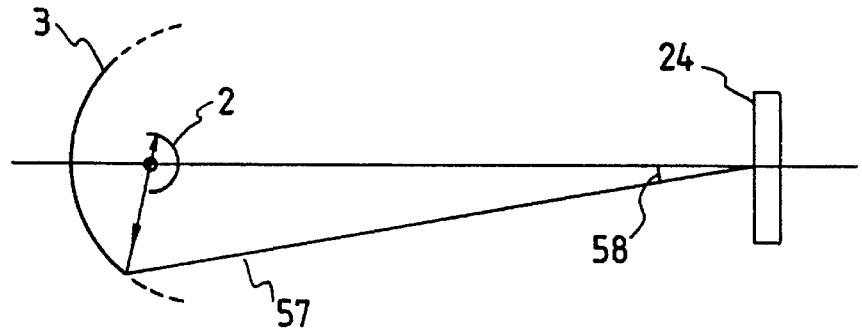

FIGS. 21a and 21b depict sketches illustrating manners in which the reflection film (2) or the reflection mirror (9) provided in the bulb (4) of the lamp (1) can make narrower the angle for the luminous flux to the liquid crystal surface (24) of the liquid crystal display device (23).

The light emitted by the light emitting gap (51) of the lamp (1) is reflected by any point of the reflector (3) before being collected onto the liquid crystal display device (23). In light collection, an incident angle (56) to the liquid crystal display device (23) is made large as the reflected light, like a light (55) in FIG. 21a, is near the outmost edge of the reflector (3). Such a light component 117 is returned to a gap between electrodes, the light emitting gap (51) of the lamp (1), by the reflection film (2) or the reflection mirror (9) provided in the bulb (4) of the lamp (1) of the present invention once. The returned light component, as shown by a light component (57) in FIG. 21b, is reflected at a point near the center of the reflector (3) before being collected on the liquid crystal surface (24), thereby being capable of making an incident angle (58) narrower.

If the illumination unit for projection display apparatus meets Eq. C-3 below, it can efficiently illuminate the light to the reflector (3) and can suppress its divergent angle, thereby being capable of making higher the light utilization coefficient of the illumination unit for projection display apparatus.

$$D \geq 4f \geq 0.75 \times D \qquad (C\text{-}3)$$

where D denotes the aperture of the reflector (3), and f is the focal length (50) of the reflector (3).

Also, any of the above-described illumination units for projection display apparatus can be used for the projection display apparatus that the light emitted by the lamp (1) is collected by the condenser lens (14) to illuminate the liquid crystal display device (23), and the transillumination light is projected to the screen (26) by the projection lens (25). This can increase the brightness of the image on the screen (26).

Further, a correction lens (53) can be arranged in the vicinity of a point (59) at which the section in an optic axis direction of the light flux overlaps on the optic axis. This can make the light flux having a wide angle from the optic axis closer to parallel to the optic axis.

Similarly, any of the above-described illumination units for a projection display apparatus can be used for the projection display apparatus of three-panel type to increase the brightness of the image on the screen (26).

Still further, if there is provided the microlens array (42) formed of the unit lens sections for collecting into the area of every picture element electrode (39) forming the liquid crystal display device (23) the light coming out of the polarizing plate (41) provided to the light incoming surface in the liquid crystal display device (23), the effect of suppressing the angle for luminous flux lower is that a feature of the illumination unit of the present invention can make the effective angular aperture of the panels wider, thereby increasing the brightness of the image on the screen (26).

Still further, if the illumination unit meets the conditions of Eqs. C-1 and C-2, it can increase the light collection coefficient. 10 In turn, the following describes the conditions by reference to FIGS. 18a, 18b, 19a and 19b.

FIGS. 18a, 18b, 19a and 19b depict sectional views illustrating principles of operation of the present invention for the illumination unit.

Figure 18A:
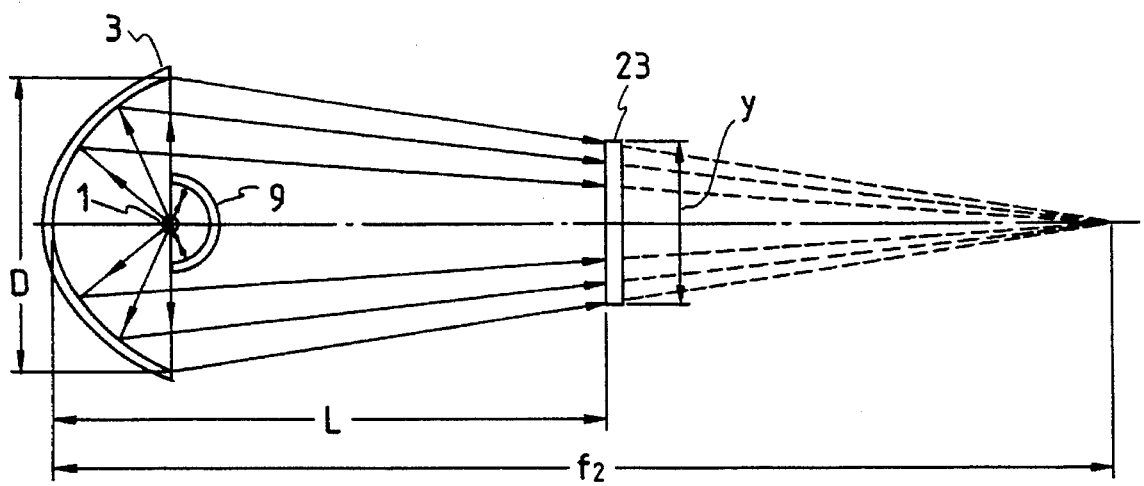
FIGS. 18a and 18b are sectional views illustrating the principles of operation of the illumination unit of the present invention.
Figure 18B:
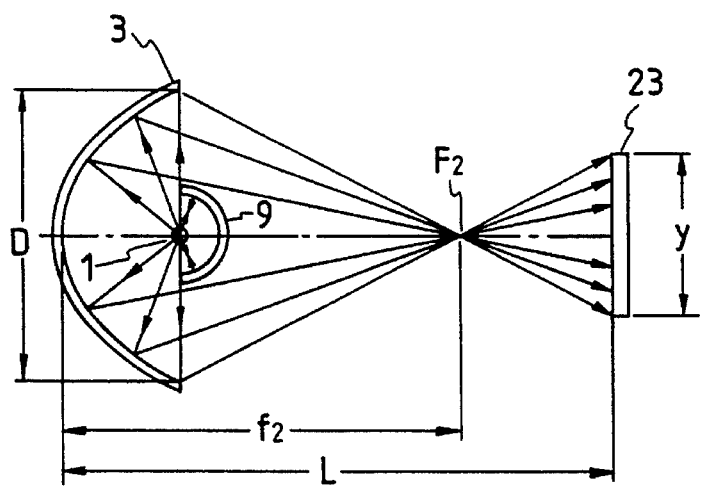
Figure 19A:
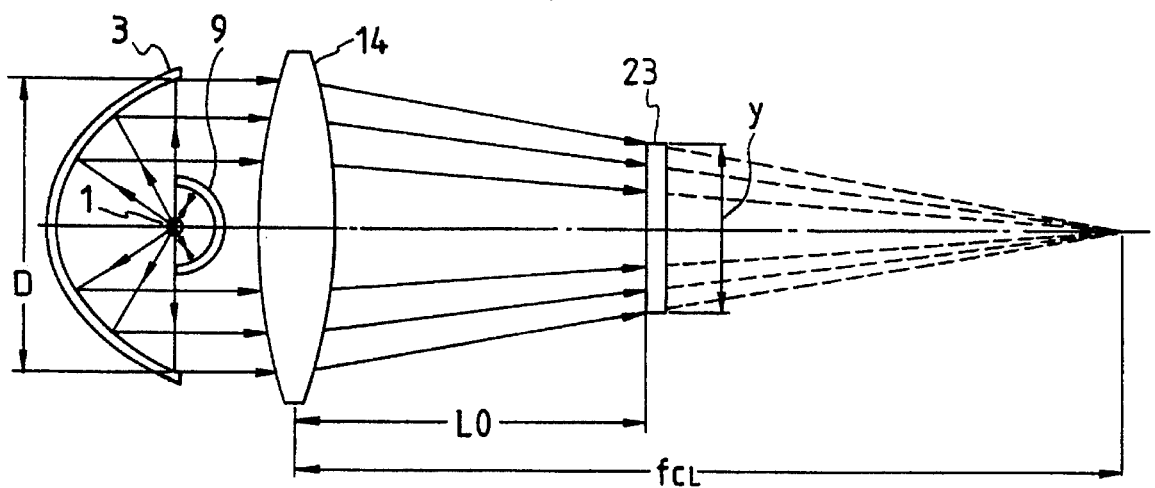
FIGS. 19a and 19b are sectional views illustrating the construction of the illumination unit of an embodiment of the present invention.
Figure 19B:
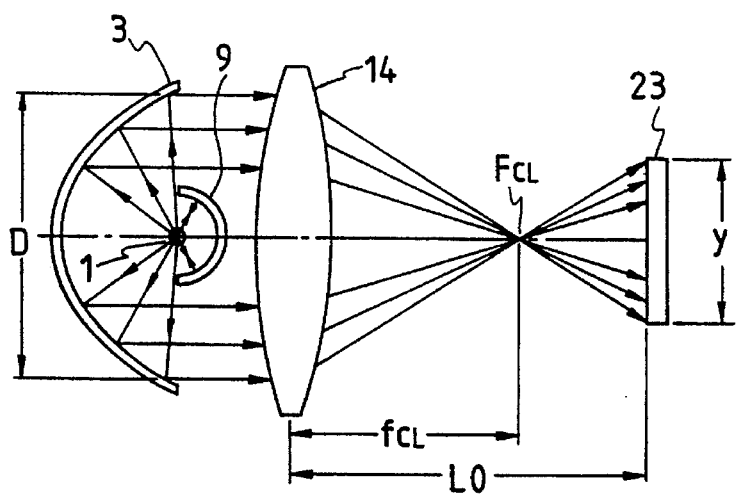

FIGS. 18a and 18b are the sectional view illustrating the principles of operation of the illumination unit which is formed of a lamp (1), the reflector (3) for collecting a light emitted by the lamp (1) onto a liquid crystal display device (23) positioned at an illumination surface, and a reflection mirror (9) a disposed near the bulb of the lamp (1). FIGS. 19a and 19b are the sectional view illustrating the principles of operation of the illumination unit having an additional condenser lens (14) in the construction in FIGS. 18a and 18b.

First, the following describes the operation of the construction having no condenser lens (14). In FIG. 18a, letter $f_2$ denotes a second focal length of the reflector (3). The reflector (3) of the present invention is shaped ellipsoid. The lamp (1) is positioned in the vicinity of a first focal point of the reflector (3). In nature of the ellipse, the light emitted by the lamp (1) is focused at the second focal point of the reflector (3). To increase the light collection rate, a width of the light flux coming to the liquid crystal display device (23) has to be made equal to or narrower than a diagonal length of the liquid crystal display device (23).

As shown in FIGS. 18a and 18b, the second focal length of the reflector (3) is denoted by $f_2$, a distance from a center of the reflector (3) to the liquid crystal display device (23) is L, an aperture of the reflector (3) is D, and a diagonal length of the liquid crystal display device (23) is y.

In FIG. 18a in which $f_2 > L$, the width of the light flux coming into the liquid crystal display device (23) coincides with the diagonal length of the liquid crystal display device (23). In FIG. 18b in which $f_2 < L$, the width of the light flux coming into the liquid crystal display device (23) coincides with the diagonal length of the liquid crystal display device (23).

In FIG. 18a, to make the width of the light flux coming into the liquid crystal display device (23) coincide with the diagonal length of the liquid crystal display device (23), the second focal length $f_2$ of the reflector (3) should be $$f_2 = (D \times L)/(D - y) \qquad (C\text{-}4)$$

If the second focal length $f_2$ of the reflector (3) is longer than the one in Eq. C-4, the width of the light flux coming into the liquid crystal display device (23) becomes longer than the diagonal length of the liquid crystal display device (23). This decreases the light collection rate.

In FIG. 18b, the second focal length $f_2$ of the reflector (3) should be $$f_2 = (D \times L)/(D+y) \tag{C-5}$$

If the second focal length f of the reflector (3) is shorter than the one in Eq. C-5, the width of the light flux coming into the liquid crystal display device (23) becomes longer than the diagonal length of the liquid crystal display device (23). This decreases the light collection rate.

Therefore, it is effective that the illumination unit meets Eq. C-1.

In turn, the following describes the operation of the construction having the condenser lens (14). In FIG. 19a, letter $f_{CL}$ denotes a focal length of the condenser lens (14). The condenser lens (14) of the present invention is shaped paraboloid. The lamp (1) is positioned in the vicinity of a first focal point of the reflector (3). In nature of the parabola, the light emitted by the lamp (1) is made parallel to enter the condenser lens (14). The condenser lens (14) collects the light to illuminate the liquid crystal display device (23). To increase the light collection rate, a width of the light flux coming to the liquid crystal display device (23) has to be made equal to or narrower than a diagonal length of the liquid crystal display device (23).

As shown in FIGS. 19a and 19b, the focal length of the condenser lens (14) is denoted by $f_{CL}$, a distance from the condenser lens (14) to the liquid crystal display device (23) is LO, an aperture of the reflector (3) is D, and a diagonal length of the liquid crystal display device (23) is y.

In FIG. 19a in which $f_{CL} > LO$, the width of the light flux coming into the liquid crystal display device (23) coincides with the diagonal length of the liquid crystal display device (23). In FIG. 19b in which $f_{CL} < LO$, the width of the light flux coming into the liquid crystal display device (23) coincides with the diagonal length of the liquid crystal display device (23).

In FIG. 19a, to make the width of the light flux coming into the liquid crystal display device (23) coincide with the diagonal length of the liquid crystal display device (23), the focal length $f_{CL}$ of the condenser lens (14) should be $$f_{CL} = (D \times LO)/(D-y) \tag{C-6}$$

If the focal length $f_{CL}$ of the condenser lens (14) is longer than the one in Eq. C-6, the width of the light flux coming into the liquid crystal display device (23) becomes longer than the diagonal length of the liquid crystal display device (23). This decreases the light collection rate.

In FIG. 19b, the focal length $f_{CL}$ of the condenser lens (14) should be $$f_{CL} = (D \times LO)/(D+y) \tag{C-7}$$

If the focal length $f_{CL}$ of the condenser lens (14) is shorter than the one in Eq. C-7, the width of the light flux coming into the liquid crystal display device (23) becomes longer than the diagonal length of the liquid crystal display device (23). This decreases the light collection rate.

Therefore, it is effective that the illumination unit meets Eq. C-2.

Further, if there is provided the microlens array (42) formed of the unit lens sections for collecting into the area of every picture element electrode (39) forming the liquid crystal display device (23) the light coming out of the polarizing plate (41) provided to the light incoming surface in the liquid crystal display device (23), the brightness of the image on the screen (26) can be increased.

The following describes in detail embodiments according to the present invention by reference to the accompanying drawings.

FIG. 16 depicts a construction and a block diagram illustrating an embodiment of the present invention for a liquid crystal display apparatus.

In FIG. 16 are indicated a light source (1) which is made of, for example, a metal halide lamp or a halogen lamp, an ellipsoid reflector (3), a spherical second reflector (9), a cold filter (63), a liquid crystal display device (23), a projecting lens (25) for enlarging an image on the liquid crystal display device (23), and a screen (26).

The liquid crystal display device (23) is driven by a drive circuit, for example, shown in the block diagram of FIG. 16. In the figure, a video chroma circuit (64), an RGB circuit (65), an X driver (62), a synchronous process circuit (66), a control circuit (67), and an Y driver (61) are shown. The following describes operation of the embodiment mentioned above.

In the construction mentioned above, as the light source (1) is arranged in the vicinity of a first position of the reflector (3), a light emitted from the light source (1) is reflected by the reflector (3). The reflected light is illuminated onto the liquid crystal display device (23) through the cold filter (63). The light reflected by the second reflector (9) is returned to the light source (1) once before coming to the reflector (3), and is reflected by the reflector (3) to illuminate onto the liquid crystal display device (23) through the cold filter (63).

As having two reflectors (3) and (9), one in front of the light source (1) and the other behind the light source (1), the liquid crystal display apparatus of the present invention can effectively use most of the light emitted from the light source (1). The elliptically shaped reflector (3) is arranged to have optimum focal length, aperture, and position to obtain a high condensation rate. The image displayed on the liquid crystal display device (23) is enlarged through the projection lens (25). As a result, the screen (26) can have an enlarged image thereon.

A video signal fed from a laser disk player, a VTR, or the like (not shown) is properly processed by the video chroma circuit (64) before being input to the RGB circuit (65). To feed picture signals corresponding to R, G, and B and an ac signal to drive the liquid crystal display device (23), the RGB circuit (65) inverses their polarities every vertical period before feeding them to electrodes of the liquid crystal display device (23) through the X driver (62). The video chroma circuit (64), the RGB output circuit (65), the X driver (62), the synchronous process circuit (66), and the Y driver (61) are synchronized by the controls circuit (67).

Figure 17:
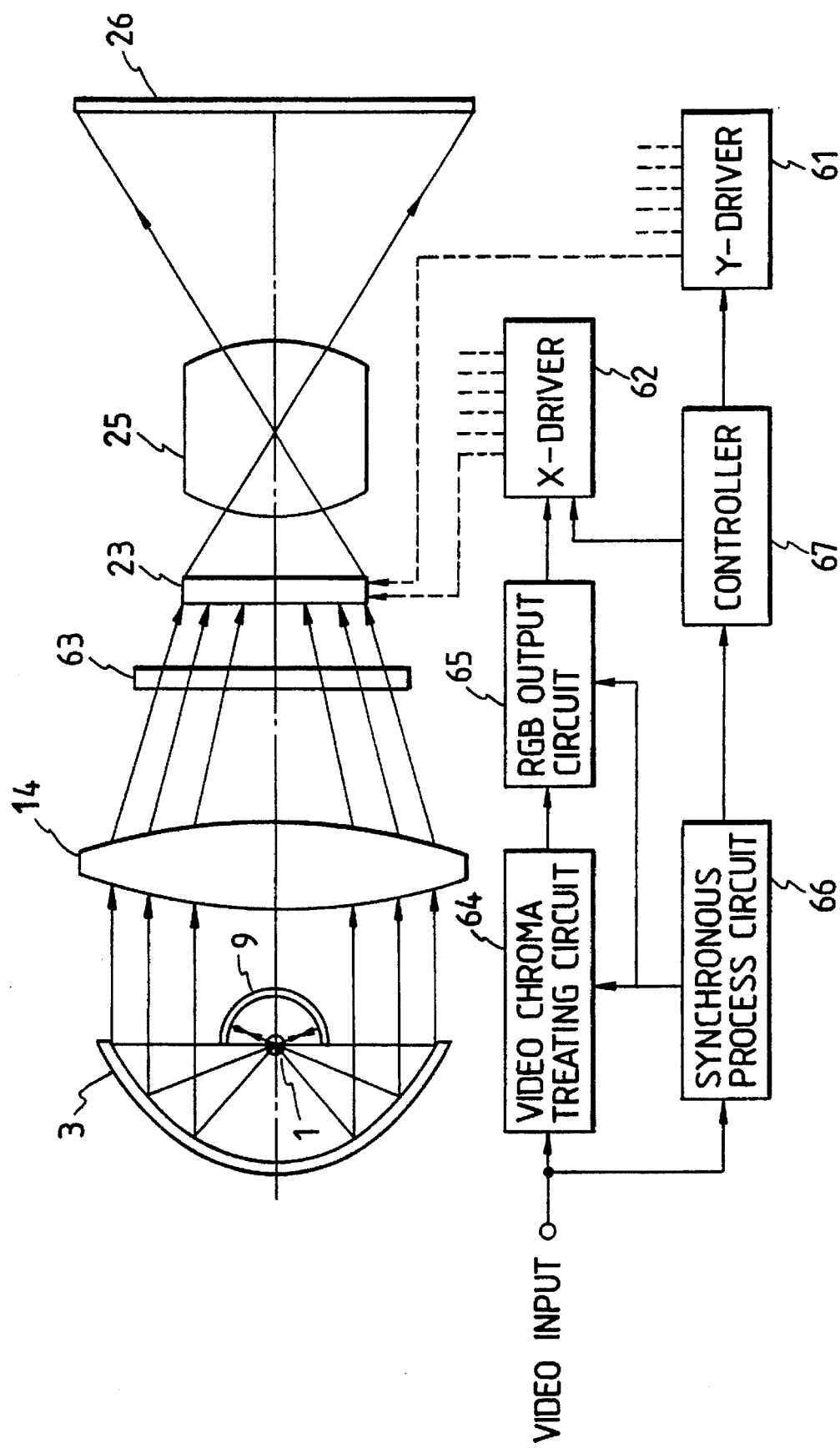
FIG. 17 is a sectional and a block diagram illustrating a construction of a second embodiment of the present invention for a liquid crystal display apparatus.

FIG. 17 depicts a construction and a block diagram illustrating another embodiment of the present invention for a liquid crystal display apparatus having a condenser lens used therein.

Figure 8:
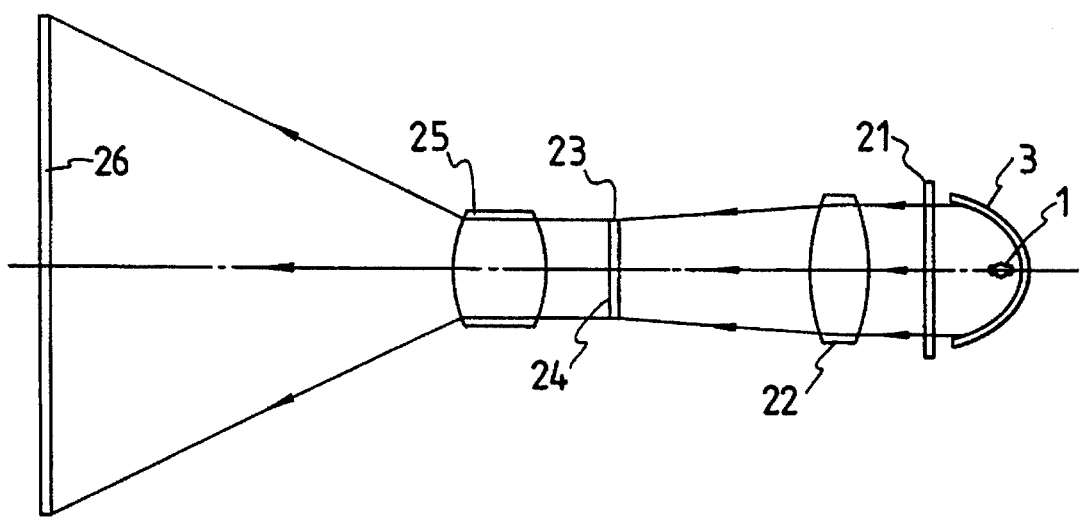
FIG. 8 is a sectional view illustrating a construction of a liquid crystal display apparatus of single-panel type having the illumination unit according to the present invention.

FIG. 8 depicts a sectional view illustrating a construction of an embodiment of the present invention for a liquid crystal projection display apparatus.

A light emitted from the metal halide lamp (1), a xenon lamp, the halogen lamp, or the like is reflected by the reflector (3). The light then has an infrared component cut out through infrared filter (21) before coming into the liquid crystal display device (23) through the converging lens (22) to project a bright image onto the screen (26) via the projection lens (25). Note that the liquid crystal display apparatus of the present invention can have the condenser lens (14) omitted to make the light source 1 emit the light to the liquid crystal display device (23) directly.

In the embodiments described above, one sheet of liquid crystal display device (23) is used as the light valve. Therefore, it need hardly be said that the liquid crystal display device (23) has to have color filters (not shown) provided therein. The embodiments, also, can be applied to a method which uses three sheets of liquid crystal display device (23) corresponding to so-called three primary colors R, G, and B.

FIG. 1 depicts a partly sectional view illustrating a construction of an illumination unit having a lamp (1) that can be virtually regarded as a spot light source.

The lamp (1) emits light as a front electrode 7 and a back electrode 8 make discharge. In the figure, a gap between the front electrode 7 and the back electrode 8 is narrow enough to be regarded as the spot light source. A center of the light emission coincides with that of a bulb (4).

Figure 7:
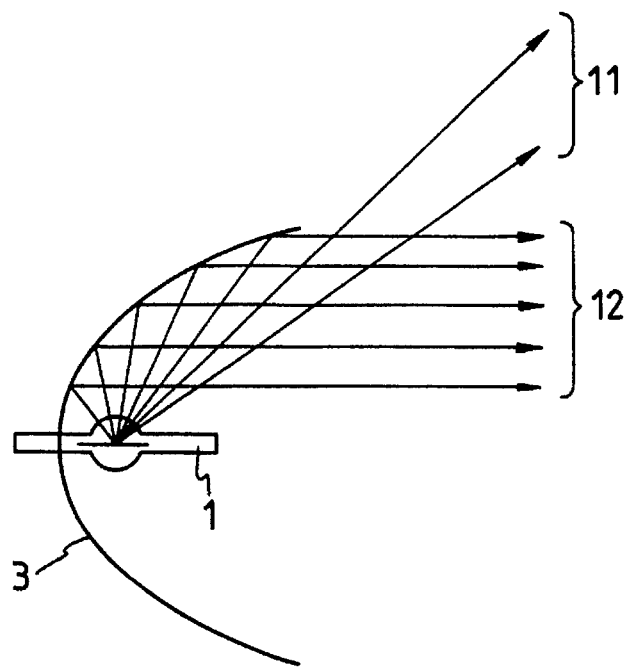
FIG. 7 is a sectional view illustrating a construction of a usual illumination unit.

A light component (13) of the emitted light is reflected by the reflector (3) before being condensed. A light component (14) of the emitted light is reflected to bend over by a reflection film (2) before coming to the reflector (3). In light sources of the prior arts, the light component (14) is lost as being scattered out of the reflector (3) as shown by light components (11) in FIG. 7. In FIG. 1, on the other hand, the light component (14) can be returned to the reflector (3) side. This means that equivalent density of the light component (13) can be substantially doubled or the light utilization coefficient can be increased virtually twice.

In turn, the following describes the present invention in which the lamp (1) cannot be regarded as a spot light source.

Figure 2:
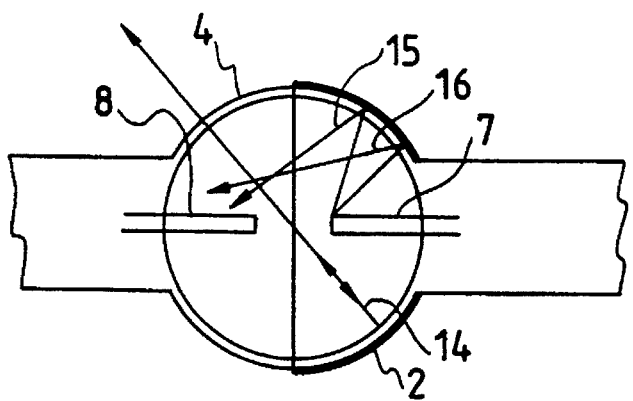
FIGS. 2 to 4 are partly sectional views illustrating constructions of illumination units of the present invention having a lamp (1) electrodes of which are open therebetween.

In FIG. 2, a gap between a front electrode 7 and a back electrode 8 is wide. The light component 14 going from a central gap of the electrodes 7 and 8 to the reflection film (2) is directed to the reflector (3) to increase the light utilization coefficient as in FIG. 1. However, light components (15) and (16) emitted from an end of the front electrode 7, for example, are reflected by the reflection film (2) before being obstructed by the rear electrode 8 and other parts. They cannot reach the reflector (3).

Figure 3:
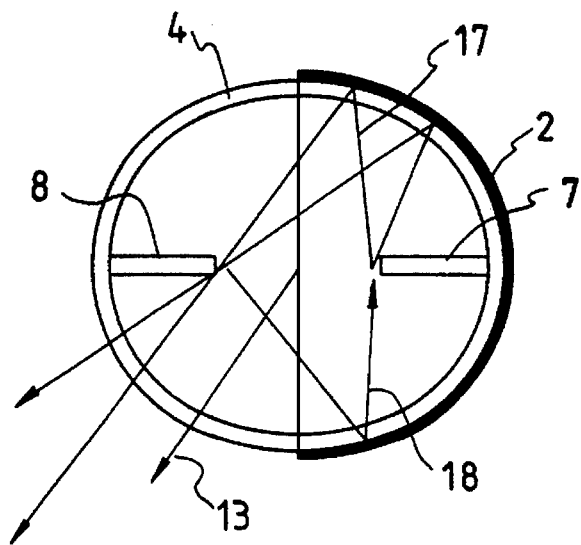

To improve such an inefficiency, as shown in FIG. 3, the illumination unit of the present invention has the bulb (4) shaped elliptic so that the reflection film (2) has an ellipsoid. Two focal points of the ellipsoid are made to virtually coincide with ends of a front electrode 7 and a back electrode 8.

FIG. 3 depicts a cross-sectional view illustrating another embodiment of the present invention for further increasing the light utilization coefficient of the embodiment in FIG. 2. In FIG. 3, a light component (17) emitted by the end of the front electrode (7) and reflected by the reflection film (2) passes the end of the back electrode (8) to re-emit to the reflector (3) by nature of the ellipsoid. As the light emitted from the end of the front electrode (7) is added to a light (13), it can be effectively used. A light component (18), like the light component (17), emitted by the end of the back electrode (8) and reflected by the reflection film (2) passes the end of the reflected light (17) to re-emit to the reflector (3) before being added to the light (13).

Figure 4:
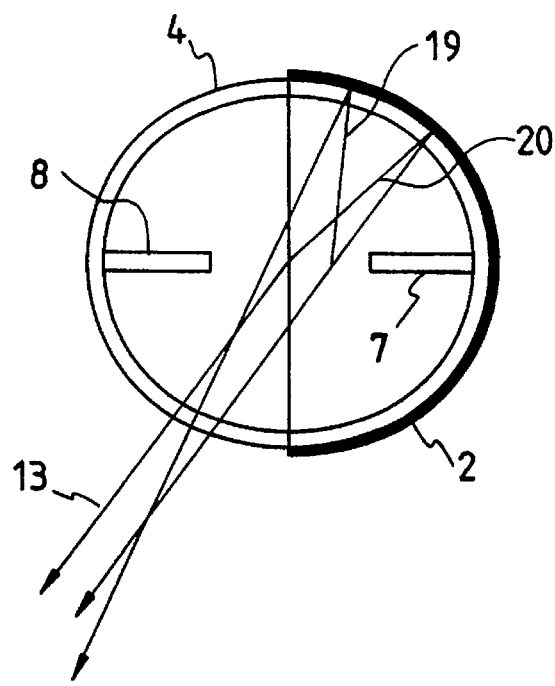

As shown in FIG. 4, light components (19) and (20) emitted from points other than the ends of the electrodes (7) and (8) are bent over by the reflection film (2) before passing between the electrodes (7) and (8). The passed light components are added to the light (13) on the reflector (3).

If a gap between the ends of the front electrode (7) and the back electrode (8) is 5 mm, the ellipsoid of the reflection film (2) is given by $$x^2/6^2 + y^2/5.5^2 = 1 \quad \text{(C-8)}$$

The reflector (3) is a paraboloid having the focal length of 11 mm and the aperture of 80 mm.

Figure 15A:
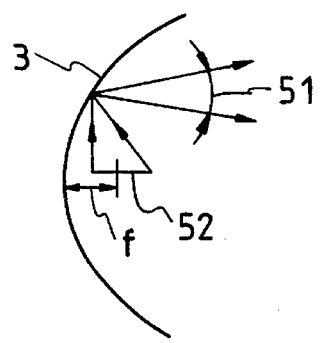
FIGS. 15a and 15b are each of a change of a divergent angle with a distance of a light emitting angle (51).

As described above, for the illumination unit having the wide gap between the front electrode (7) and the back electrode (8), the reflection film (2) is made to have the ellipsoid, and the ends of the front electrode (7) and the back electrode 8 are made to virtually coincide with the two focal points of the ellipsoid. This can use virtually all the light emitted from a thin, long emitting gap (51) as shown in FIG. 15a between the electrodes.

Instead of the reflection film (2), a reflection mirror (9), as shown in FIG. 6, of the same shape can be used.

The lamp (1) can be a halogen lamp (1) for the same effect in place of the discharge lamp, such as the metal halide lamp or the xenon lamp. If the emitting gap (51) is made of filament, the arc of the light emitting gap (51) of the discharge lamp (1), as shown in FIG. 1 or FIG. 5, can be replaced by the filament.

Figure 5:
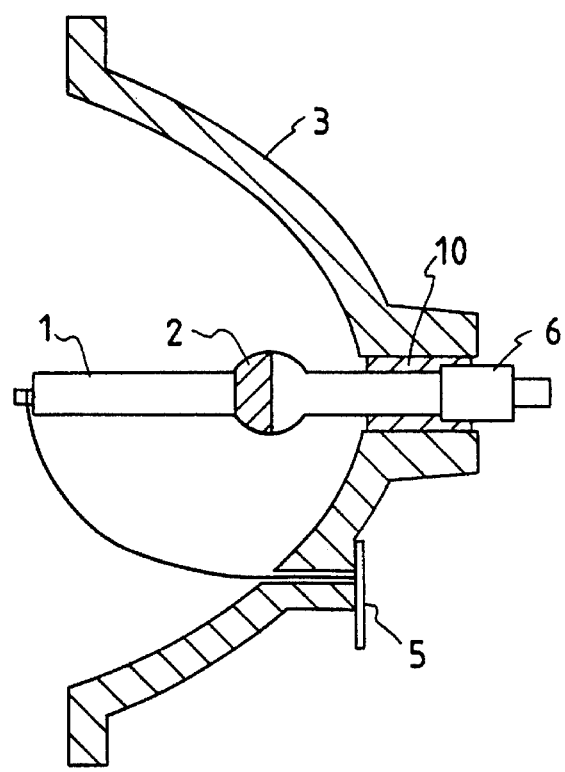
FIGS. 5 and 6 are cross-sectional views illustrating constructions of illumination units of the present invention.

FIG. 5 depicts a cross-sectional view illustrating still another embodiment of the present invention for the illumination unit for the display apparatus.

A spherical bulb (4), as shown in FIG. 4, has a reflection film (2) formed on a half part thereof on an aperture side of a reflector (3). The bulb (4), as shown in FIG. 4, also has an emitting center at its center.

The shape of the bulb (4) is given by $$x^2 + y^2 = 5.5 \quad \text{(C-9)}$$

Instead of the reflection film (2), a reflection mirror (9) of the same shape can be used as shown in FIG. 6.

Figure 12:
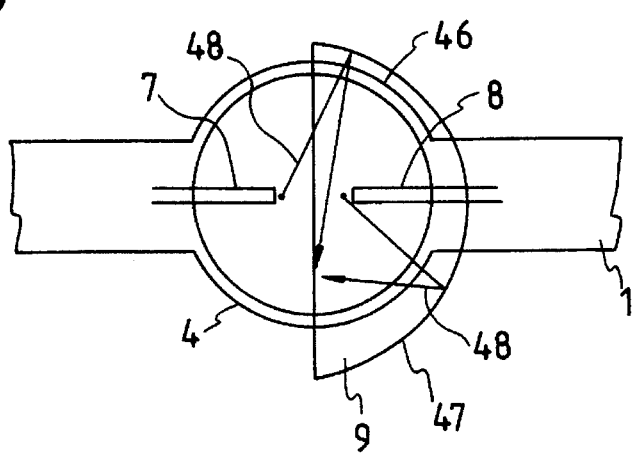
FIG. 12 is a sectional view illustrating a construction of an illumination unit having a reflection mirror (9) according to the present invention.

The reflection film (2) or the reflection mirror (9) for the illumination unit for the projection display apparatus can be formed of dichroic film (46) to reflect only visible light to the reflector (3). In consideration of serviceable life of the lamp (1), the dichroic film (46) can be made to heat ray or reflect infrared ray etc. (48) to some extent. This can increase convection of additives in the bulb (4) of the lamp (1) to make a halogen cycle active, thereby improving a blackening phenomenon of the bulb (4). If the reflection of infrared ray (48) is too little, the effect of the blackening phenomenon is low. If the reflection is too much, on the other hand, it affects durability of the bulb (4). The amount of infrared ray (48) thus has to be controlled. In this embodiment, it can be controlled by a reflection coefficient of the infrared ray (48) of the dichroic film (46) forming the reflection film (2), but not by an area of the reflection film (2). In addition to this, as shown in FIG. 12, the reflection mirror (9) can have the dichroic film (46) which can reflect only the visible light, as described above, formed on an inside thereof, or on the light source side. The reflection mirror (9) also can have the other dichroic film (46) or a usual reflection film (47) which can reflect the infrared ray (48) formed on an outside thereof to a shape different from that of the inside. This structure can concentrate the infrared ray (48) to a desired point inside the bulb (4) of the lamp (1), while reflecting the visible light emitted from the gap between the front electrode 7 and the back electrode 8 to the gap again. This can further increase the convection of additives in the bulb (4). In FIG. 12, the infrared ray (48) is concentrated below the center of the bulb (4) of the lamp (1) to increase the convection of additives.

Figure 13:
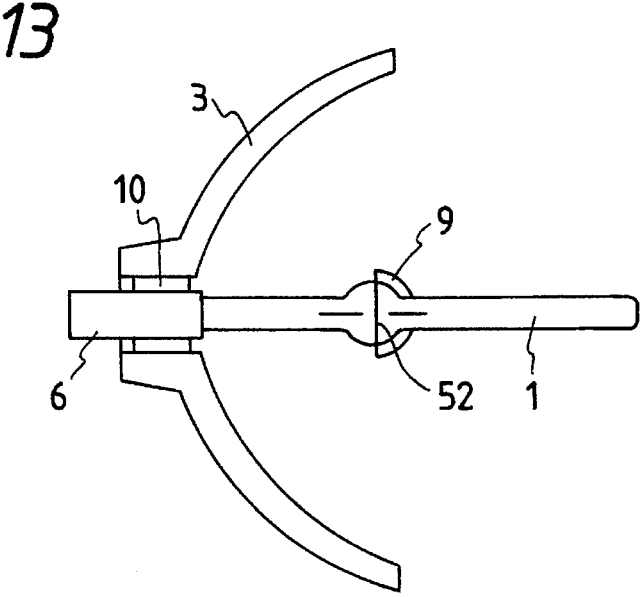
FIG. 13 is a sectional view illustrating a construction of an illumination unit according to the present invention.
Figure 14:
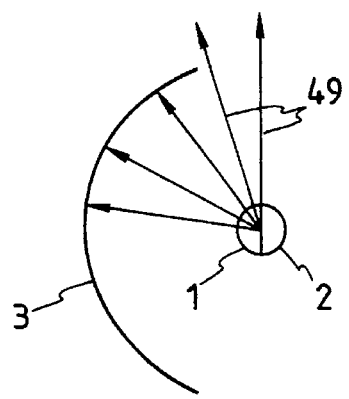
FIG. 14 is a sectional view illustrating a construction of an illumination unit having a longer focal length f.

FIG. 13 depicts an example of the illumination unit for the projection display apparatus of the present invention which meets the following requirement.

$$D \geq 4f \geq 0.75 \times D \quad \text{(C-3)}$$

where D denotes the aperture of the reflector (3), and f is the focal length (50) of the reflector (3). In Eq. C-3, if D equals 4f, the focal point of the reflector (3) is on the aperture face of the reflector (3). If the focal length f is made greater than that, the lamp (1) has to be shifted outward. This is not desirable as there are light components (49) which cannot strike on the reflector (3) as shown in FIG. 14. On the contrary, if the focal length f is made smaller, the lamp (1) has to be shifted inward to the reflector (3). This results in that the light flux diverges to a larger angle.

Figure 15B:
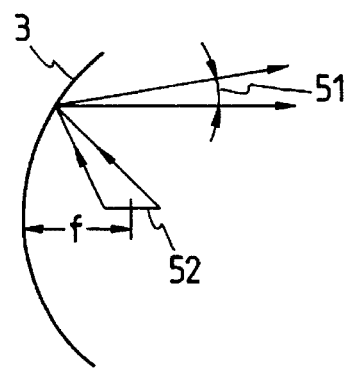

FIGS. 15a and 15b depict a change of the divergent angle (51) with the distance of the light source 1 from the reflector (3). The focal length f of the reflector (3) in FIG. 15a, is smaller than the one in FIG. 15b. The light source 1 is made closer to the reflector (3), resulting in larger divergent angle (51). The larger divergent angle (51) is not preferable as it is harder to focus the light on the illuminated surface. Thus, the aperture D of the reflector (3) and the focal length f of the reflector (3) should be set in the range given by Eq. C-3 to accomplish efficient illumination unit for the projection display apparatus. Further in the present case, (52) shows luminous part.

In this embodiment, the focal length f of the reflector (3) is set at 17 mm, and the aperture D of the reflector (3) is at 80 mm. In order to make higher a collection rate on the illuminated surface, the center of the lamp (1) is shifted a few millimeters outward. The embodiment has been described with use of the reflection mirror (9), but it need scarcely be said that the reflection film (2) also provides the same effect.

Also, the reflector (3) used in all the embodiments described above is shaped paraboloid, but it goes without saying that an ellipsoid mirror can be used to provide the same effect, provided that the focal length f of the reflector (3) should be given by $$f=b^2/(2 \times a) \quad \text{(C-10)}$$

where a and b are for ellipsoid that is made by rotating a curve given by Eq. C-11 below around axis y which is an optic axis of the ellipsoid.

$$x^2/b^2+y^2/a^2=1 \quad \text{(C-11)}$$

Alternatively for the reflector (3), hyperboloid mirror, a spherical mirror, various concave mirrors, and the ellipsoid mirror can be used as well.

The illumination unit was used in a liquid crystal projector of 1.4 inch size. A resulting converging rate was 60%.

Figure 22:
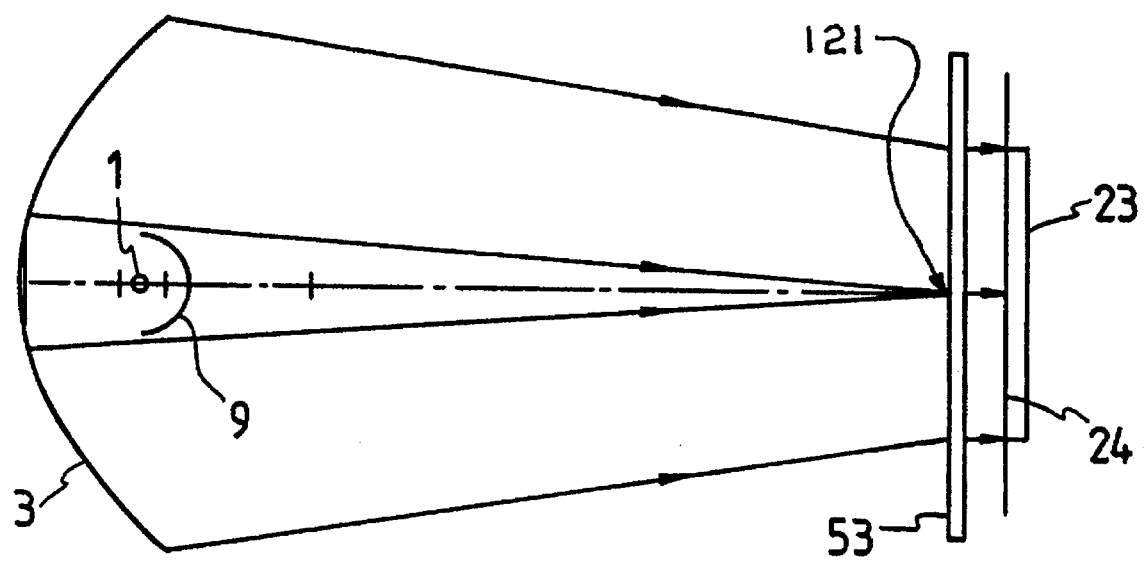
FIG. 22 is a sectional view illustrating a construction of an embodiment of the present invention for an illumination unit for a liquid crystal projection display apparatus.

FIG. 22 depicts a sectional view illustrating a construction of still another embodiment of the present invention for an illumination unit for liquid crystal projection display apparatus. A light emitted from a lamp (1) is reflected by a reflector (3). Looking to the sectional view in parallel with the optic axis in FIG. 22, there is a point 121 at which upper and lower light fluxes cross on the optic axis. A correction lens (53) is provided in the vicinity of the point 121 to make parallel the light fluxes before being illuminated onto the liquid crystal surface as shown in FIG. 22. The correction lens (53) to be used is a conical lens having a negative power or similar lenses formed of a Fresnel lens to have the same effect as shown in FIG. 22.

The illumination unit of this embodiment has the ellipsoid reflector (3) of 20 mm first focal length and 250 mm second focal length and the lamp (1) having a spherical reflection mirror (9) of 12 mm radius combined together. The illumination unit also has the correction lens (53) of Fresnel lens used therein. A resulted converging rate was 60%. A resulted light incident angle was 4 degrees.

FIG. 18a depicts a sectional view illustrating a construction of still another embodiment of the present invention for an illumination unit for liquid crystal projection display apparatus. For a light source (1) is used a 150 W metal halide lamp (1). Size of a light emitting gap (51) is 3×1 mm. A first reflector (3) used is an ellipsoid reflector of 20 mm first focal length, 400 mm second focal length, and 80 mm aperture. A second reflector (9) is a spherical mirror of 8 mm radius and 16 mm aperture. Panel size of a liquid crystal display device (23) is 1.4 inches. Distance from a center of the first reflector (3) to the liquid crystal display device (23) is 250 mm.

The first focal point of the first reflector (3) and a center of the spherical mirror of the second reflector (9) are positioned to virtually coincide together. In the metal halide lamp (1) used as the light source (1), a center of the light emitting gap (51) is positioned in the vicinity of the first focal point of the first reflector (3). A resulted converging rate in this embodiment was approximately 74%.

FIG. 18b depicts a sectional view illustrating a construction of still another embodiment of the present invention for an illumination unit for liquid crystal projection display apparatus. For the light source (1), a 150 W metal halide lamp (1) is used. Size of a light emitting gap (51) is 3×1 mm. A first reflector (3) is an ellipsoid reflector of 20 mm first focal length, 250 mm second focal length, and 80 mm aperture. A second reflector (9) is a spherical mirror of 8 mm radius and 16 mm aperture. Panel size of a liquid crystal display device (23) is 1.4 inches. Distance from a center of the first reflector (3) to the liquid crystal display device (23) is 150 mm.

The first focal point of the first reflector (3) and a center of the spherical mirror of the second reflector (9) are positioned to virtually coincide together. In the metal halide lamp (1) used as the light source 1, a center of the light emitting gap (51) is positioned in the vicinity of the first focal point of the first reflector (3). A resulted converging rate in this embodiment was approximately 70%.

FIG. 19a depicts a sectional view illustrating a construction of still another embodiment of the present invention for an illumination unit for liquid crystal projection display apparatus. For a light source 1 is used a 150 W metal halide lamp (1). Size of a light emitting gap is 3×1 mm. A first reflector (3) used is a paraboloid reflector of 20 mm first focal length and 80 mm aperture. A second reflector as for reflecting mirror (9) used is a spherical mirror of 8 mm radius and 16 mm aperture. A condenser lens (14) used is a flat convex lens of 84 mm aperture and 220 mm focal length.

Panel size of a liquid crystal display device (23) is 1.4 inches. Distance from a center of the first reflector (3) to the liquid crystal display device (23) is 250 mm. Distance from the condenser lens (14) to the liquid crystal display device (23) is 125 mm.

The first focal point of the first reflector (3) and a center of the spherical mirror of the second reflector are positioned to virtually coincide together. In the metal halide lamp (1) used as the light source 1, a center of the light emitting gap is positioned in the vicinity of the first focal point of the first reflector (3). A resulted converging rate in this embodiment was approximately 68%.

FIG. 19b depicts a sectional view illustrating a construction of still another embodiment of the present invention for an illumination unit for a liquid crystal projection display apparatus. For a light source (1) is used a 150 W metal halide lamp. Size of a light emitting gap is 3×1 mm. A first reflector (3) used is a paraboloid reflector of 20 mm first focal length and 80 mm aperture. A second reflector as for reflecting mirror (9) used is a spherical mirror of 8 mm radius and 16 mm aperture. A condenser lens (14) used is a flat convex lens of 84 mm aperture and 170 mm focal length.

Panel size of a liquid crystal display device (23) is 1.4 inches. Distance from a center of the first reflector (3) to the liquid crystal display device (23) is 180 mm. Distance from the condenser lens (14) to the liquid crystal display device (23) is 100 mm.

The first focal point of the first reflector (3) and a center of the spherical mirror (9) of the second reflector are positioned to virtually coincide together. In the metal halide lamp used as the light source (1), a center of the light emitting gap is positioned in the vicinity of the first focal point of the first reflector (3). A resulted converging rate in this embodiment was approximately 70%.

Figure 10:
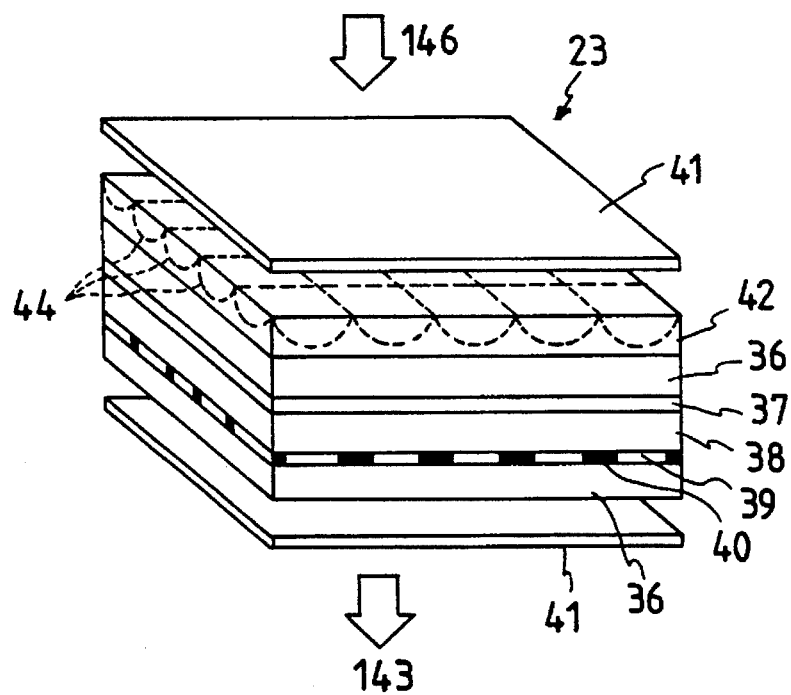
FIG. 10 is an oblique view illustrating a structure of a liquid crystal display device (23).

FIG. 10 depicts an oblique view illustrating a structure of an embodiment of the present invention for the liquid crystal display,device (23). An incoming light 146 is converged to every picture element electrode (39) of a liquid crystal (38) through a polarizing plate (41) by a microlens array (42). It should be noted that the liquid crystal display device (23) having no microlens array (42) is available.

Figure 11:
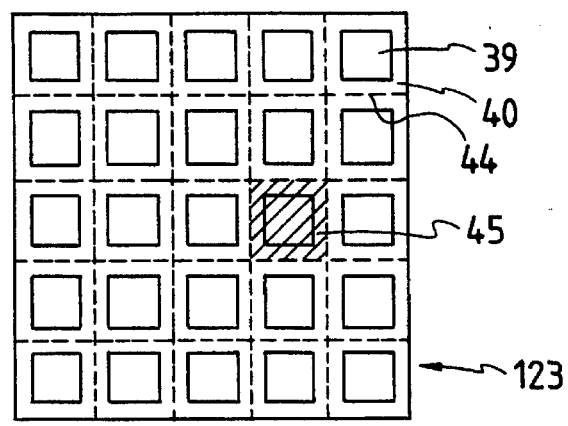
FIG. 11 is a plan view illustrating positions of picture element electrodes the liquid crystal display device (23) in FIG. 10.

FIG. 11 depicts a plan view illustrating positions of picture element electrodes of the liquid crystal display device (123) of an embodiment (23) of the present invention. As an incoming light 146 is focused into the picture element electrode (39) in each picture element area by the microlens array (42), no eclipse is made by a light shutting portion (40). This means that the angular aperture is made substantially greater to obtain a bright image.

The microlens array (42) can be integrated in a transparent substrate (36).

Figure 9:
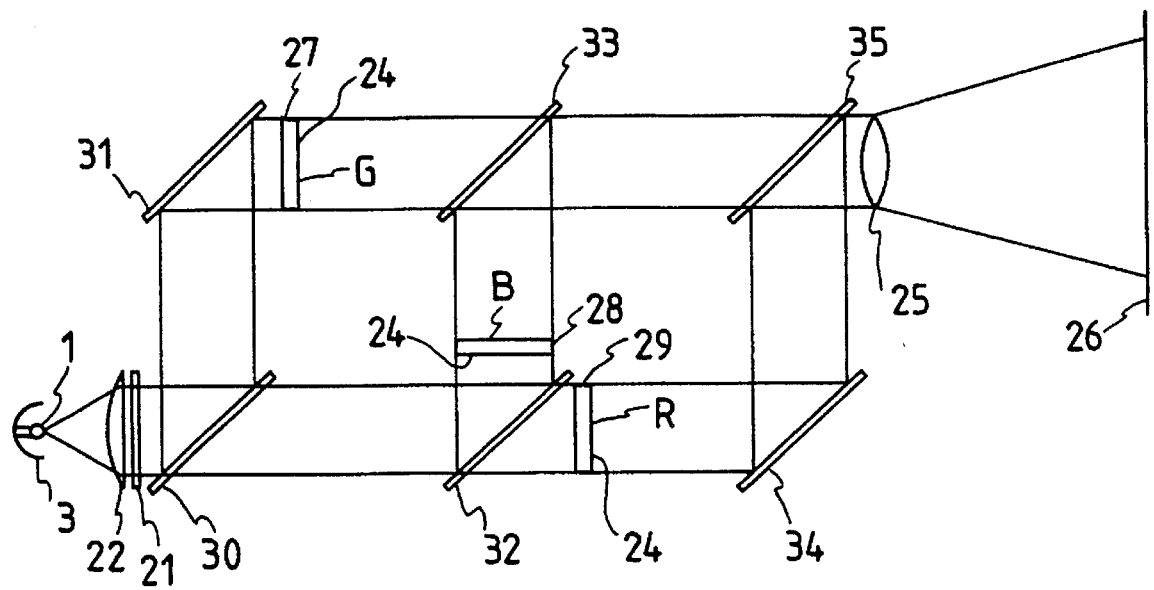
FIG. 9 is a perspective view illustrating a construction of a liquid crystal display apparatus of three-panel type having the illumination unit according to the present invention.

FIG. 9 depicts a perspective view illustrating a construction of a liquid crystal projection display apparatus of three-panel type having the illumination unit according to the present invention.

A light emitted from the metal halide lamp (1), the xenon lamp (1), the halogen lamp (1), or the like is reflected by the reflector (3). The light then enters the infrared filter (21) through the condenser lens (14). The infrared filter (21) cuts out its infrared component. In turn, a spectral diffraction optical system formed of dichroic mirrors (30) and (32) and a total reflection mirror (34) separates the light to three colors, green, blue, and red. The color lights are passed through a green liquid crystal display device (27), a blue liquid crystal display device (28), and a red liquid crystal display device (29), respectively. The color lights then are composed by a color composing optical system formed of dichroic mirrors (33) and (35) and the total reflection mirror (34). The composed light is projected through the projection lens (25) to the screen (26) to have a bright image. It should be noted that there may be a liquid crystal display apparatus in which the condenser lens (14) can be omitted, but the illumination unit of the present invention can directly emit light to the infrared filter (21).

What is claimed is:

1. The illumination unit for a projection type liquid crystal display comprising:

at least a light source for emitting light, the light source including two electrodes for emitting light;

a reflector for focusing the light emitted from the light source onto a liquid crystal display element; and an elliptical reflecting mirror for reflecting the light emitted from the light source toward said reflector, the elliptical reflecting mirror having two focal points, the two focal points being positioned to coincide with ends of the two electrodes of the light source, respectively.

2. A projection type liquid crystal display unit comprising:

a light source for emitting light;

a reflector for focusing the light from said light source, the reflector having a shape which satisfies the following conditional expression:

$$D \geq 4f \geq 0.75 \times D$$

where D indicates an aperture of the reflector and f indicates a focal length of the reflector;

a liquid crystal display element which is illuminated by the light emitted from said light source, and;

a projection lens for enlarging and projecting an image on said liquid crystal display element onto a screen.

3. A projection type liquid crystal display comprising:

a light source for emitting light, a reflector for focusing and emitting the light from the light source onto a liquid crystal display element which is illuminated by the light from said light source, a projection lens for enlarging and projecting an image on said liquid crystal display element onto a screen, and a dichroic reflecting mirror which is formed in said light source by a dichroic film which transmits thermic rays and reflects visible rays.

4. A projection type liquid crystal display unit comprising:

a light source for emitting light, a liquid crystal display element which is illuminated by light emitted from said light source, a projection lens for enlarging and projecting an image from said liquid crystal display element onto a screen; and, an elliptical reflector for focusing light from the light source, the reflector having a shape which satisfies the following conditional expression:

$$(D \times L)/(D+y) < f < (D \times L)/(D+y)$$

where L indicates a distance from a top of the reflector to the liquid crystal display element, f is a focal length of the reflector, D is an aperture of the reflector, and y is a diagonal length of the liquid crystal display element.

5. A projection type liquid crystal display unit comprising:

a light source for emitting light, a reflector for focusing the light from the light source, a condenser lens for focusing the light from the reflector, a liquid crystal display element which is to be illuminated by said focused light, a projection lens for enlarging and projecting an image from said liquid crystal display element onto a screen, and the reflector having a shape which satisfies the following conditional expression:

$$(D-LO)/(D+y) < f_{CL} < (D-LO)/(D-y)$$

where LO indicates a distance from the condenser lens to the liquid crystal display element, $f_{CL}$ is a focal length of the condenser lens, D is an aperture of the condenser lens, and y is a diagonal length of the liquid crystal display element.

\* \* \* \* \*